US006965829B2

(12) United States Patent
Yamadaji et al.

(10) Patent No.: US 6,965,829 B2
(45) Date of Patent: Nov. 15, 2005

(54) ON-VEHICLE ELECTRONIC APPARATUS

(75) Inventors: Shinji Yamadaji, Tachikawa (JP); Mitsuaki Moritani, Yokohama (JP); Kosei Okamoto, Kunitachi (JP); Hideyuki Toma, Kodaira (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/632,841

(22) Filed: Aug. 4, 2003

(65) Prior Publication Data

US 2004/0049343 A1 Mar. 11, 2004

(30) Foreign Application Priority Data

Sep. 5, 2002 (JP) ....................................... 2002-260146

(51) Int. Cl.[7] ................................................ G06F 17/10
(52) U.S. Cl. ......................... 701/301; 701/93; 340/436; 340/903
(58) Field of Search ............................ 701/93, 96, 300, 701/301; 340/436, 903

(56) References Cited

U.S. PATENT DOCUMENTS

| | | | | | |
|---|---|---|---|---|---|
| 4,361,202 | A | * 11/1982 | Minovitch | 180/168 |
| 4,628,317 | A | * 12/1986 | Nishikawa et al. | 340/903 |
| 6,061,628 | A | * 5/2000 | Hayashi et al. | 701/208 |
| 6,603,394 | B2 | * 8/2003 | Raichle et al. | 340/438 |
| 2002/0057195 | A1 | * 5/2002 | Yamamura | 340/435 |
| 2003/0016636 | A1 | * 1/2003 | Tari et al. | 370/328 |
| 2003/0109972 | A1 | * 6/2003 | Tak | 701/29 |

FOREIGN PATENT DOCUMENTS

| | | |
|---|---|---|
| JP | 5-266399 | 10/1993 |
| JP | 6-282796 | 10/1994 |
| JP | 7-249191 | 9/1995 |
| JP | 9-180094 | 7/1997 |
| JP | 10-96636 | 4/1998 |
| JP | 10-096636 | 4/1998 |
| JP | 10-307997 | 11/1998 |
| JP | 11-64025 | 3/1999 |
| JP | 11-88431 | 3/1999 |
| JP | 11-088431 | 3/1999 |
| JP | 2000-207691 | 7/2000 |
| JP | 2000-242898 | 9/2000 |
| JP | 2000-266551 | 9/2000 |
| JP | 2000-330637 | 11/2000 |
| JP | 2000-348289 | 12/2000 |
| JP | 2001-201354 | 7/2001 |
| JP | 2001-244874 | 9/2001 |
| JP | 2002-176676 | 6/2002 |
| JP | 2002-221430 | 8/2002 |
| JP | 2002-236080 | 8/2002 |

OTHER PUBLICATIONS

Notification of Reasons for Rejection (Office Action) Japanese Patent Application No. 2002–260146.

* cited by examiner

*Primary Examiner*—Gertrude A. Jeanglaude
(74) *Attorney, Agent, or Firm*—Finnegan, Henderson, Farabow, Garrett & Dunner, L.L.P.

(57) ABSTRACT

This invention provides an on-vehicle electronic apparatus, which has a wireless communication unit which makes a wireless communication via a wireless LAN, means for acquiring position information and velocity information of vehicles before and after the self vehicle using the wireless communication unit, means for calculating the inter-vehicle distances between the self vehicle, and the vehicles before and after the self vehicle with reference to map information on the basis of the acquired position information and velocity information, and means for, when the calculated inter-vehicle distances are equal to or smaller than a predetermined distance and the velocities of the self vehicle and the vehicles before and after the self vehicle are equal to or higher than a predetermined velocity, taking a collision avoidance measure.

19 Claims, 10 Drawing Sheets

ON-VEHICLE ELECTRONIC APPARATUS

CROSS-REFERENCE TO RELATED APPLICATIONS

This application is based upon and claims the benefit of priority from the prior Japanese Patent Application No. 2002-260146, filed Sep. 5, 2002, the entire contents of which are incorporated herein by reference.

BACKGROUND OF THE INVENTION

1. Field of the Invention

The present invention relates to an on-vehicle electronic apparatus and, more particularly, to a car navigation apparatus that uses a wireless LAN.

2. Description of the Related Art

In recent years, an automobile which comprises an obstacle detection/warning device has been proposed. As an example of such automobile, ultrasonic sensors are provided to the front and rear portions of a vehicle so as to detect the distances between vehicles and to detect any obstacle.

Each ultrasonic sensor radiates ultrasonic pulses, and receives a wave reflected by any obstacle, thereby detecting an obstacle. Furthermore, by measuring the time required until the reflected wave is received, the distance to the obstacle can be measured.

Upon detection of an obstacle, an audible warning is generated or a warning dialog is displayed to issue a warning to the driver (e.g., see Jpn. Pat. Appln. KOKAI Publication No. 2000-330637).

On the other hand, a car navigation system that mounts a GPS (Global Positioning System) has been developed. Such car navigation system can display information associated with car navigation such as a travel history or the like on a map, and can download and update map information from a server connected to the Internet using a line of a portable phone attached to the car navigation system.

The user can reach a destination by referring to information associated with car navigation such as a travel history or the like on the map, which is displayed on the display screen of the car navigation system (e.g., see Jpn. Pat. Appln. KOKAI Publication No. 2002-221430).

However, since the conventional obstacle detection/warning device uses ultrasonic sensors to detect any obstacle, the detection range of such sensor is narrow, and that device cannot effectively avoid collision between vehicles with a sufficient time margin.

The conventional car navigation system can navigate the driver of a vehicle by its navigation function, but cannot effectively avoid collision or the like.

BRIEF SUMMARY OF THE INVENTION

According to the first aspect of the present invention, there is provided an on-vehicle electronic apparatus comprising a wireless communication unit which makes a wireless communication via a wireless LAN, means for acquiring position information and velocity information each indicating positions and velocities of vehicles before and after the self vehicle using the wireless communication unit, means for calculating inter-vehicle distances between the self vehicle, and the vehicles before and after the self vehicle with reference to map information on the basis of the acquired position information and velocity information, and means for taking a collision avoidance measure when the calculated inter-vehicle distances are not more than a predetermined distance, and the velocities of the self vehicle and the vehicles before and after the self vehicle are not less than a predetermined velocity.

According to the second aspect of the present invention, there is provided an on-vehicle electronic apparatus, comprising means for acquiring position information and velocity information each indicating positions and velocities of foremost and rearmost vehicles of a travel group including a self vehicle, and at least one vehicle which is included in the travel group and serves as a wireless transponder using a wireless LAN of vehicles included in the travel group, means for calculating a length of the travel group using map information on the basis of the acquired position information indicating the positions of the foremost and rearmost vehicles, means for calculating a distance from the foremost vehicle of the travel group to the self vehicle using the map information on the basis of the acquired position information of the foremost vehicle and the acquired position information of the self vehicle, means for calculating a time required until the self vehicle leaves the travel group, on the basis of the acquired velocity information of the respective vehicles and the calculated distance, and means for notifying a driver of the self vehicle of the calculated length of the travel group and the calculated time.

According to the third aspect of the present invention, there is provided an on-vehicle electronic apparatus comprising means for receiving a packet which contains information indicating a position of a transmission destination and information to be transmitted to the transmission destination, from another on-vehicle electronic apparatus, means for, when the packet is received, checking if connection with the transmission destination indicated by the information contained in the packet can be established using a wireless LAN, means for, when the connection can be established, transmitting the information to be transmitted to the transmission destination, which is contained in the packet, to the transmission destination using the wireless LAN, means for, when the connection cannot be established, acquiring position information and velocity information of vehicles around a self vehicle using the wireless LAN, means for selecting a vehicle closest to the transmission destination on the basis of the acquired position information and velocity information of the vehicles around the self vehicle, and the information which is contained in the packet and indicates the position of the transmission destination, and means for transmitting the packet to the selected vehicle using the wireless LAN.

According to the fourth aspect of the present invention, there is provided an on-vehicle electronic apparatus comprising means for acquiring route information from a plurality of vehicles around a self vehicle using a wireless LAN, means for estimating a route which may be jammed on the basis of the route information acquired from the plurality of vehicles, means for, when the estimated route that may be jammed matches a part of a self route, searching for another route which does not include the matched route, and means for presenting the found route to a driver.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below serve to explain the principles of the invention.

DETAILED DESCRIPTION OF THE INVENTION

A car navigation apparatus according to preferred embodiments of the present invention will be described hereinafter with reference to the accompanying drawings.

<First Embodiment>

Figure 1:
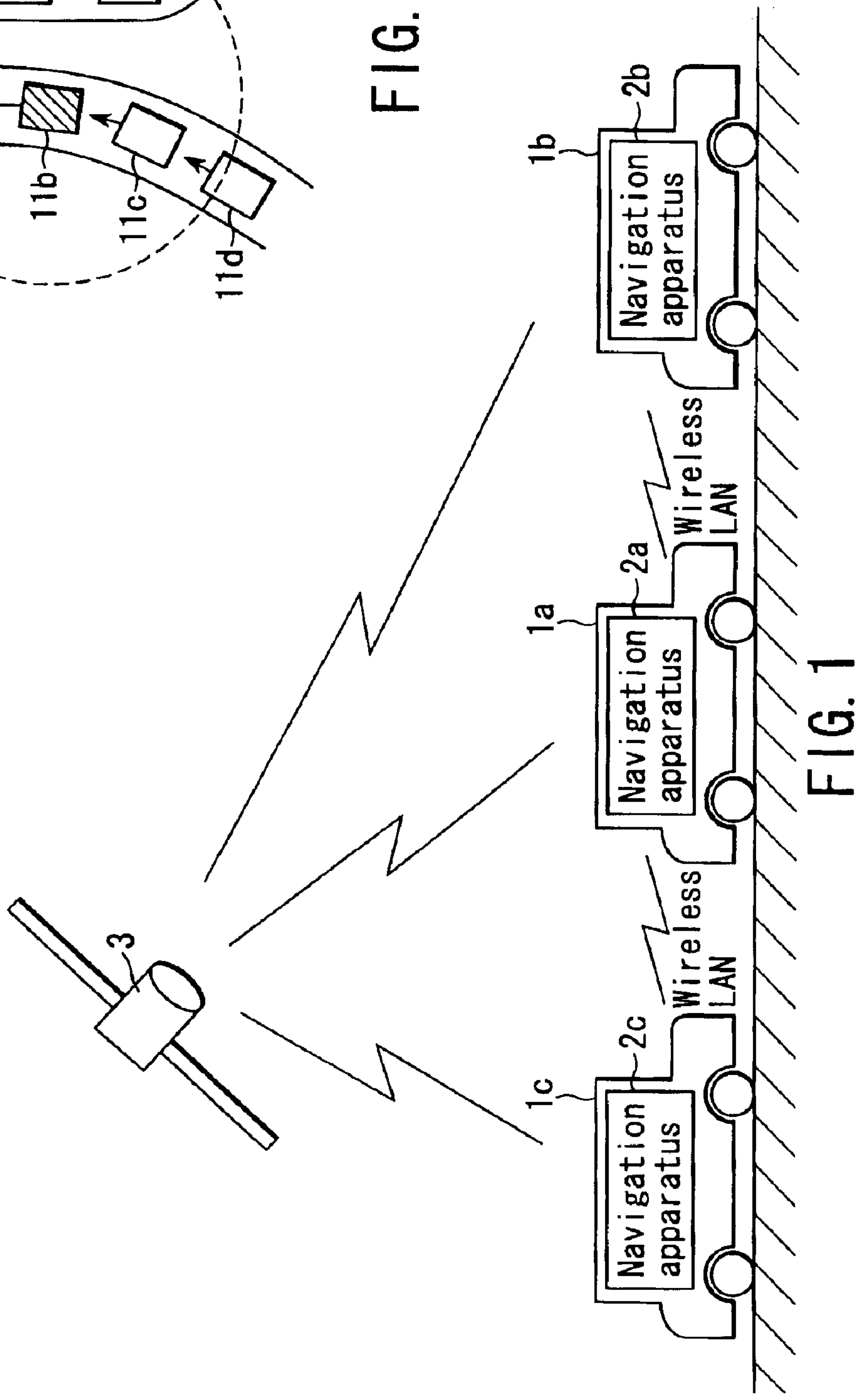
FIG. 1 is a view for explaining the operation of a car navigation apparatus according to the first embodiment of the present invention.

FIG. 1 is a view for explaining the operation of a car navigation apparatus according to the first embodiment of the present invention.

In the embodiment of the present invention, navigation apparatuses 2*a* to 2*c* mounted on vehicles 1*a* to 1*c* avoid any collision using a GPS signal from a satellite 3 and a wireless LAN.

Figure 3:
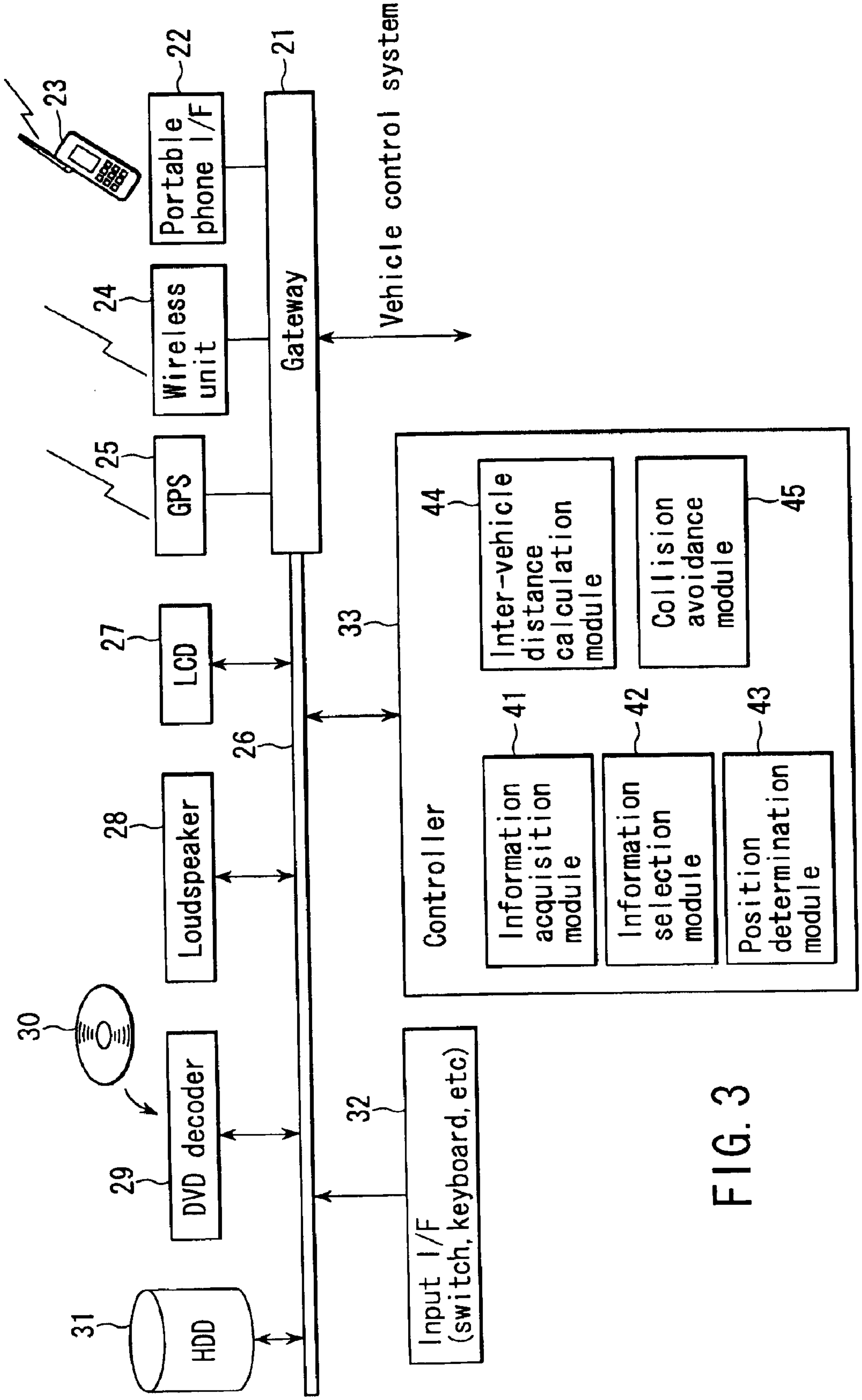
FIG. 3 is a block diagram showing the arrangement of the car navigation apparatus according to the first embodiment of the present invention.

FIG. 3 shows the arrangement of a car navigation apparatus according to the first embodiment of the present invention.

As shown in FIG. 3, a gateway 21 bridges information of a vehicle control system to a bus 26. Also, a portable phone I/F 22 to which a portable phone 23 is attached, a wireless unit 24, and a GPS 25 are connected to the gateway 21, which bridges information from these portable phone I/F 22, wireless unit 24, and GPS 25 to the bus 26.

An LCD (Liquid Crystal Display) 27, a loudspeaker 28, a DVD decoder 29 used to decode a DVD medium 30 that stores map information and the like, an HDD 31 that stores information associated with car navigation, an input interface 32 of switches, a keyboard, and the like, and a controller 33 are connected to the bus 26.

The LCD 27 displays information required to carry out car navigation.

The loudspeaker 28 audibly notifies the user of information associated with navigation and the like.

The DVD decoder 29 decodes map information or the like stored in the DVD medium 30.

The HDD 31 stores information associated with car navigation such as travel history information and the like, additional information input by the user, and the like.

The input I/F 32 is an interface for input devices such as switches, a keyboard, and the like.

The controller 33 controls the overall navigation apparatus 2, and comprises an information acquisition module 41, information selection module 42, position determination module 43, inter-vehicle distance calculation module 44, and collision avoidance module 45.

The information acquisition module 41 acquires position information and velocity information each indicating positions and velocities of vehicles around the self vehicle via the wireless unit 24 using the wireless LAN. Also, the module 41 acquires latitude/longitude information indicating the position of the self vehicle and the like using the GPS 25.

The information selection module 42 selects position information and velocity information of vehicles before and after the self vehicle from those around the self vehicle acquired by the information acquisition module 41 with reference to map information. The method of selecting position information and velocity information of vehicles before and after the self vehicle will be described below with reference to FIG. 2.

Figure 2:
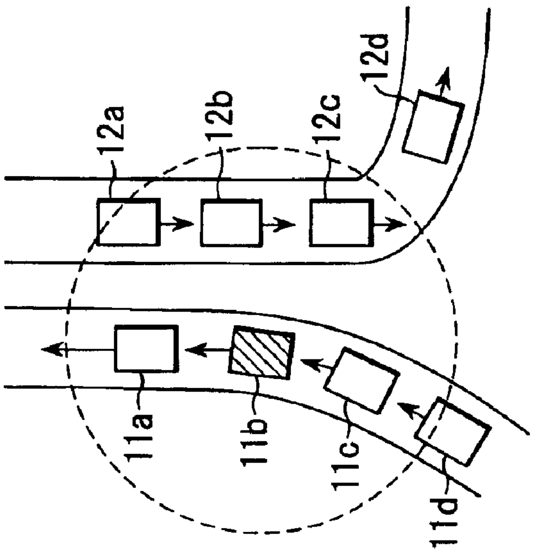
FIG. 2 is a view for explaining a method of selecting position information and velocity information of vehicles before and after the self vehicle.

Referring to FIG. 2, assuming that a vehicle 11*b* is the self vehicle, and the area of the wireless LAN corresponds to that bounded by the broken line, the self vehicle 11*b* can wirelessly communicate with vehicles 11*a*, 11*c*, and 12*a* to 12*c*, and can acquire position information and velocity information from these vehicles 11*a*, 11*c*, and 12*a* to 12*c*.

With reference to map information, the user can recognize that the vehicles 12*a* to 12*c* are traveling along a road different from the self vehicle. Even when these vehicles 12*a* to 12*c* are traveling along the identical road, one can recognize on the basis of a velocity vector contained in each velocity information that they are traveling in a direction different from the self vehicle. Hence, it is seen that these vehicles 12*a* to 12*c* are not those which are traveling before and after the self vehicle.

On the other hand, one can recognize with reference to the map information that the vehicles 11*a* and 11*c* are those which are traveling along the identical road, and based on the velocity information that their velocity vectors point to nearly the same direction. Hence, it becomes apparent that the vehicles 11*a* and 11*b* are those which are traveling before and after the self vehicle 11*b*.

Even if position information and velocity information can be acquired from a vehicle 11*d*, it is apparent with reference to the position information and map information that the vehicles 11*a* and 11*b* are those which are traveling before and after the self vehicle 11*b*.

The position determination module 43 determines the positions of the vehicles before and after the self vehicle on the map on the basis of the position information of the vehicles before and after the self vehicle acquired by the information acquisition module 41. The module 43 also determines the position on the map on the basis of the position information of the self vehicle.

The inter-vehicle distance calculation module 44 calculates inter-vehicle distances between the self vehicle and the vehicles before and after the self vehicle on the basis of the positions of the self vehicle and the vehicles before and after the self vehicle, which are determined by the position determination module 43, with reference to the map information.

When the inter-vehicle distances calculated by the inter-vehicle distance calculation module 44 are equal to or smaller than a predetermined distance and the velocities of the self vehicle and the vehicles before and after the self vehicle are equal to or higher than a predetermined velocity, the collision avoidance module 45 takes a measure for collision avoidance. The measure for collision avoidance includes, e.g., display of a warning message dialog, generation of an audible warning, deceleration and acceleration of the self vehicle, and the like.

Figure 4:
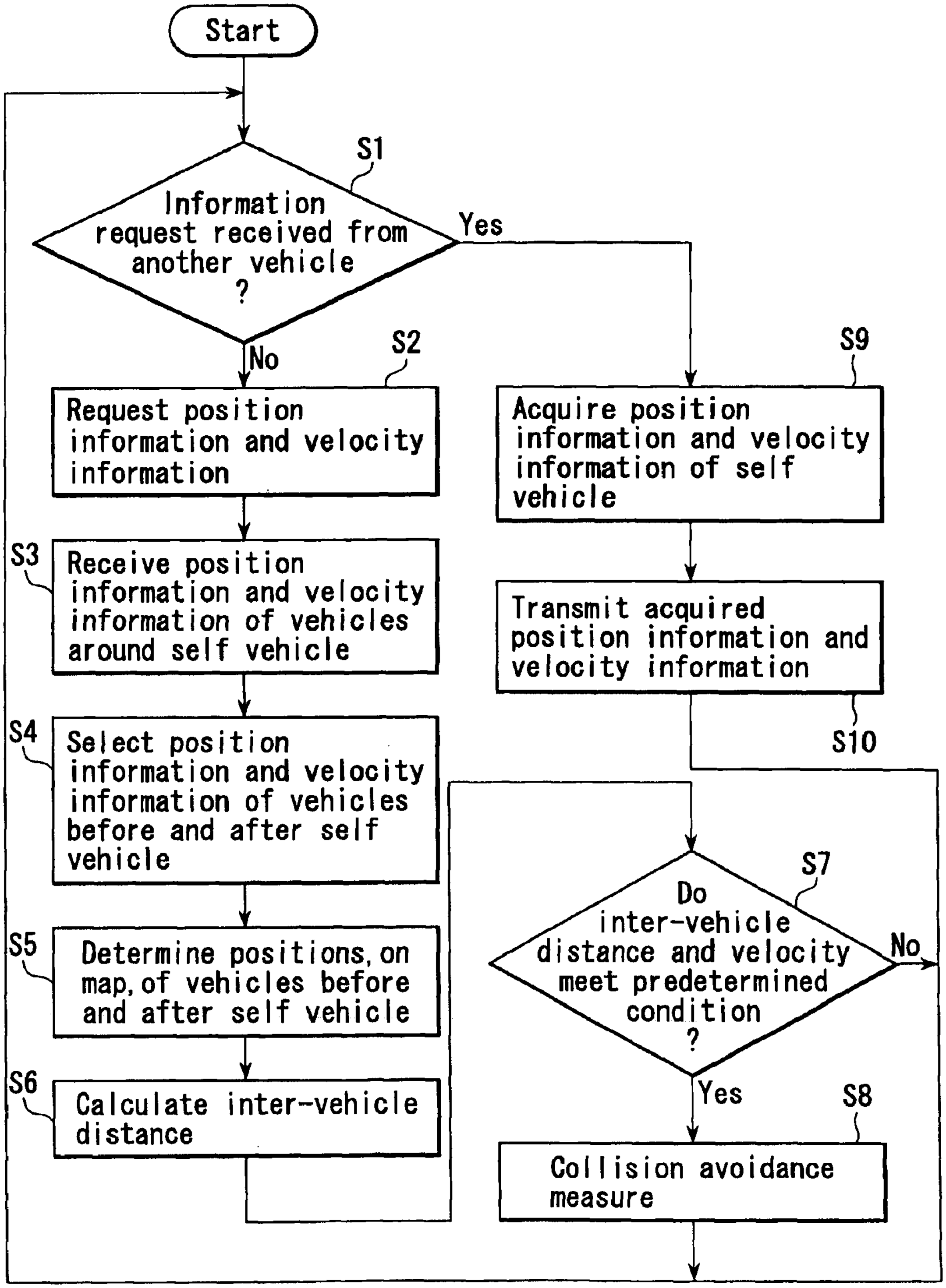
FIG. 4 is a flow chart for explaining the operation of the car navigation apparatus according to the first embodiment of the present invention.

The operation of the car navigation apparatus according to the first embodiment of the present invention will be described below with reference to the flow chart of FIG. 4.

It is checked in step S1 if an information request signal from a car navigation apparatus of another vehicle is received via the wireless LAN. If it is determined in step S1 that no information request is received, a request signal of position information and velocity information is sent to other vehicles using the wireless LAN (S2).

Figure 5:
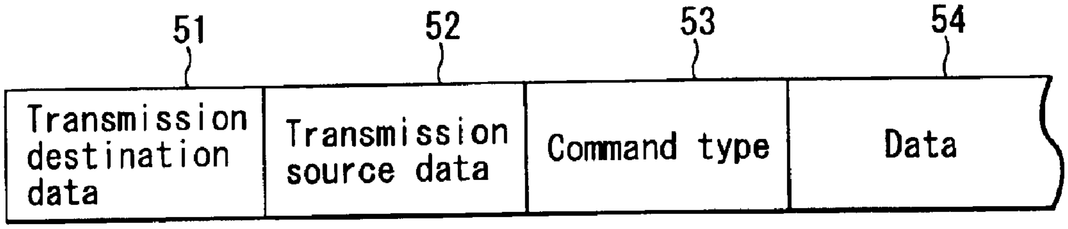
FIG. 5 is a view for explaining a data structure.

The data structure of the request signal of such information has a transmission destination data field 51, transmission source data field 52, command type field 53, and data field 54, as shown in, e.g., FIG. 5.

The transmission destination data field 51 stores information indicating a transmission destination. When data are to be acquired from all vehicles within the wireless LAN range of the self vehicle, information indicating broadcast is stored.

The transmission source data field 52 stores information indicating the car navigation apparatus which issued a packet containing those data.

The command type field 53 stores information indicating the type of command. For example, when the car navigation apparatus of the self vehicle requests to acquire position information and velocity information from that of another vehicle, this field stores information indicating a command which advises that apparatus accordingly.

The data field 54 stores data to be sent, e.g., position information and velocity information.

In response to the request, position information and velocity information of vehicles within the wireless LAN area are received (S3).

After that, position information and velocity information of vehicles before and after the self vehicle are selected from those of the vehicles within the wireless LAN area received in step S3 on the basis of the map information and the acquired position information and velocity information of the respective vehicles (S4). Furthermore, the positions of the vehicles before and after the self vehicle on the map are determined on the basis of their position information (S5). At this time, the position of the self vehicle on the map is determined with reference to the map information on the basis of its position information.

Subsequently, inter-vehicle distances are calculated with reference to the map information on the basis of the determined positions of the self vehicle and the vehicles before and after the self vehicle (S6).

It is then checked if the calculated inter-vehicle distances are equal to or smaller than a predetermined distance and the velocities of the self vehicle and the vehicles before and after the self vehicle are equal to or higher than a predetermined velocity (S7). If it is determined that these conditions are met, a collision avoidance measure is taken (S8), and the flow returns to step S1. Also, if it is determined in step S7 that the conditions are not met, the flow returns to step S1. Note that the collision avoidance measure includes, e.g., display of a warning message dialog, generation of an audible warning, deceleration and acceleration of the self vehicle, and the like.

If it is determined in step S1 that an information request from another vehicle is received, position information and velocity information of the self vehicle are acquired using the wireless LAN (S9). The acquired position information and velocity information are transmitted to a car navigation apparatus of the other vehicle that issued the information request using the wireless LAN (S10).

Therefore, with the car navigation apparatus according to the embodiment of the present invention, since collision prevention checking is done using the wireless LAN and GPS function without using any sensors, collision between vehicles can be effectively prevented with a sufficient time margin.

Since the wireless LAN is used, an existing car navigation system can be effectively utilized.

<Second Embodiment>

A car navigation apparatus according to another embodiment of the present invention will be described below.

Figure 6:
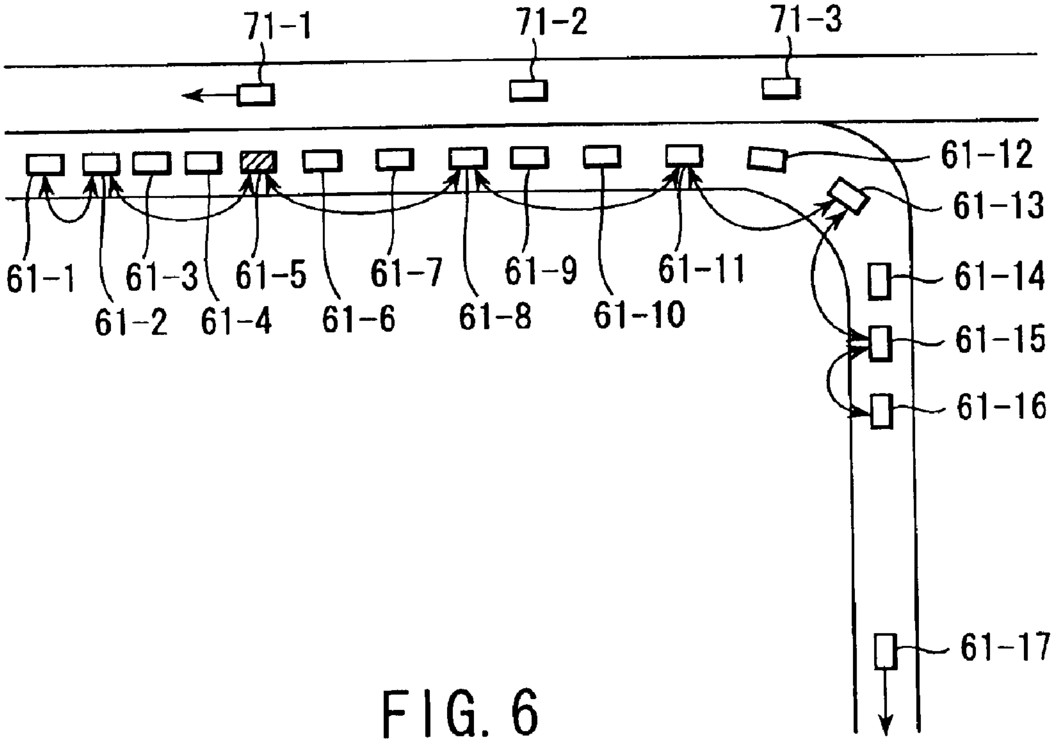
FIG. 6 is a view for explaining the operation of a car navigation apparatus according to the second embodiment of the present invention.

FIG. 6 is a view for explaining the operation of a car navigation apparatus according to the second embodiment of the present invention.

The car navigation apparatus according to this embodiment of the present invention notifies the driver of traffic jam information using a wireless LAN. For example, a case will be examined below wherein vehicles 71-1 to 71-3 are traveling along one road, vehicles 61-1 to 61-17 are traveling along the other road, and the vehicles 61-1 to 61-16 form a travel group caught in a traffic jam, as shown in FIG. 6.

Assuming that a vehicle 61-5 is the self vehicle, it sequentially acquires position information and velocity information of the vehicles 61-1 to 61-16 which form the travel group using the foremost and rearmost vehicles in the wireless LAN area of the self vehicle as transponders (access points), and presents traffic jam information obtained from the acquired information to the driver.

Figure 7:
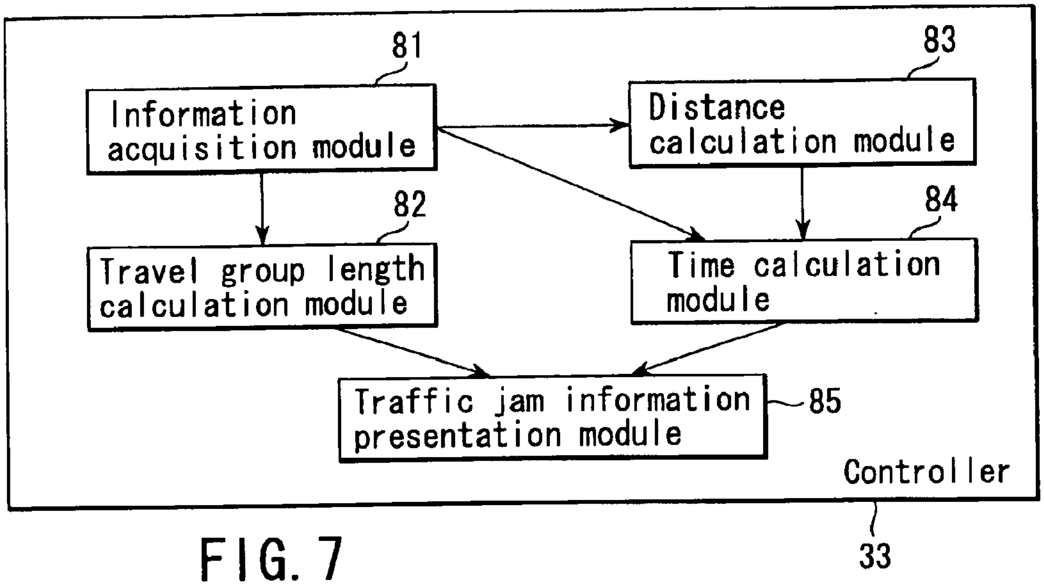
FIG. 7 is a functional block diagram for explaining the functions of a controller 33 in the car navigation apparatus according to the second embodiment of the present invention.

The car navigation apparatus has basically the same arrangement as that shown in FIG. 3, except for functions of a controller. FIG. 7 is a functional block diagram for explaining the functions of the controller 33 in the car navigation apparatus according to the second embodiment of the present invention.

As shown in FIG. 7, the controller 33 comprises an information acquisition module 81, travel group length calculation module 82, distance calculation module 83, time calculation module 84, and traffic jam information presentation module 85.

The information acquisition module 81 acquires position information and velocity information each indicating positions and velocities of vehicles around the self vehicle using the wireless LAN via the wireless unit 24, and also acquires those sent from vehicles which form a travel group.

Furthermore, the module 81 acquires latitude/longitude information indicating the position of the self vehicle and the like using the GPS 25.

The travel group length calculation module 82 calculates the length of the travel group with reference to the map information on the basis of the position information of the foremost and rearmost vehicles of those which form the travel group in the information acquired by the information acquisition module 81.

The distance calculation module 83 calculates the distance from the foremost vehicle of the travel group to the self vehicle using map information on the basis of the position information of the foremost vehicle and that of self vehicle in the information acquired by the information acquisition module 81.

The time calculation module 84 calculates the time required until the self vehicle leaves the travel group, on the basis of the velocity information of the respective vehicles acquired by the information acquisition module 81, and the calculated distance.

The traffic jam information presentation module 85 informs the driver of the self vehicle of the length of the travel group calculated by the travel group length calculation module 82, and the time calculated by the time calculation module 84. The traffic jam information presentation method is not particularly limited. For example, such information may be displayed on a screen or may be presented audibly.

Figure 9:
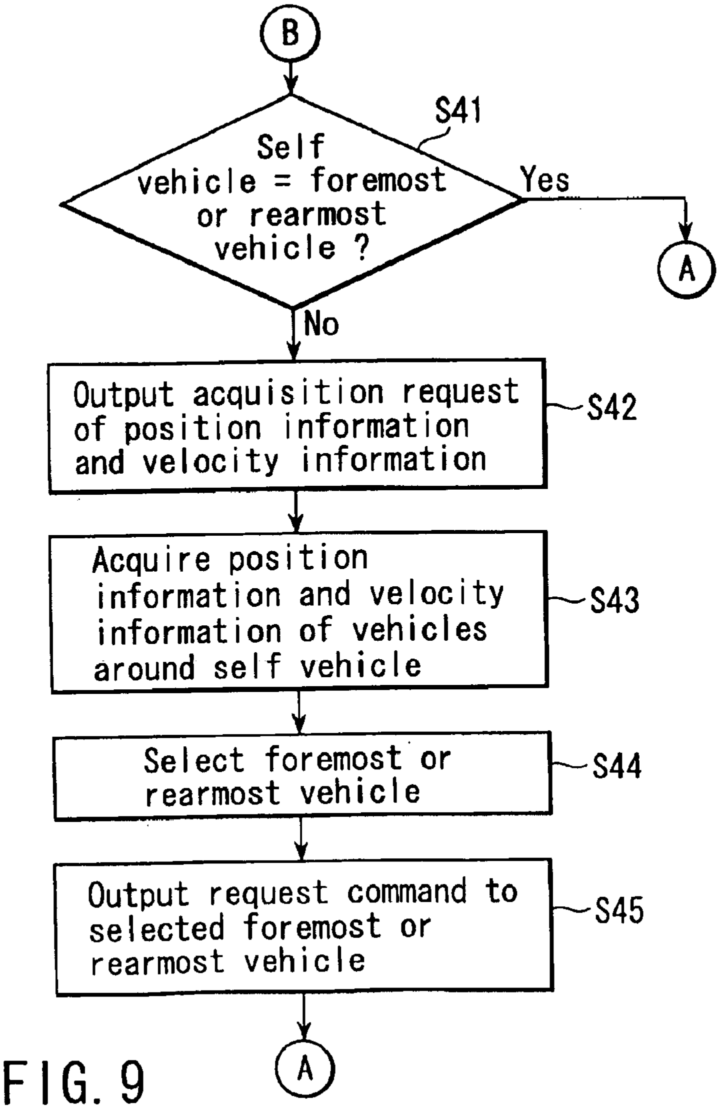
FIG. 9 is a flow chart for explaining the operation of the car navigation apparatus according to the second embodiment of the present invention.
Figure 8:
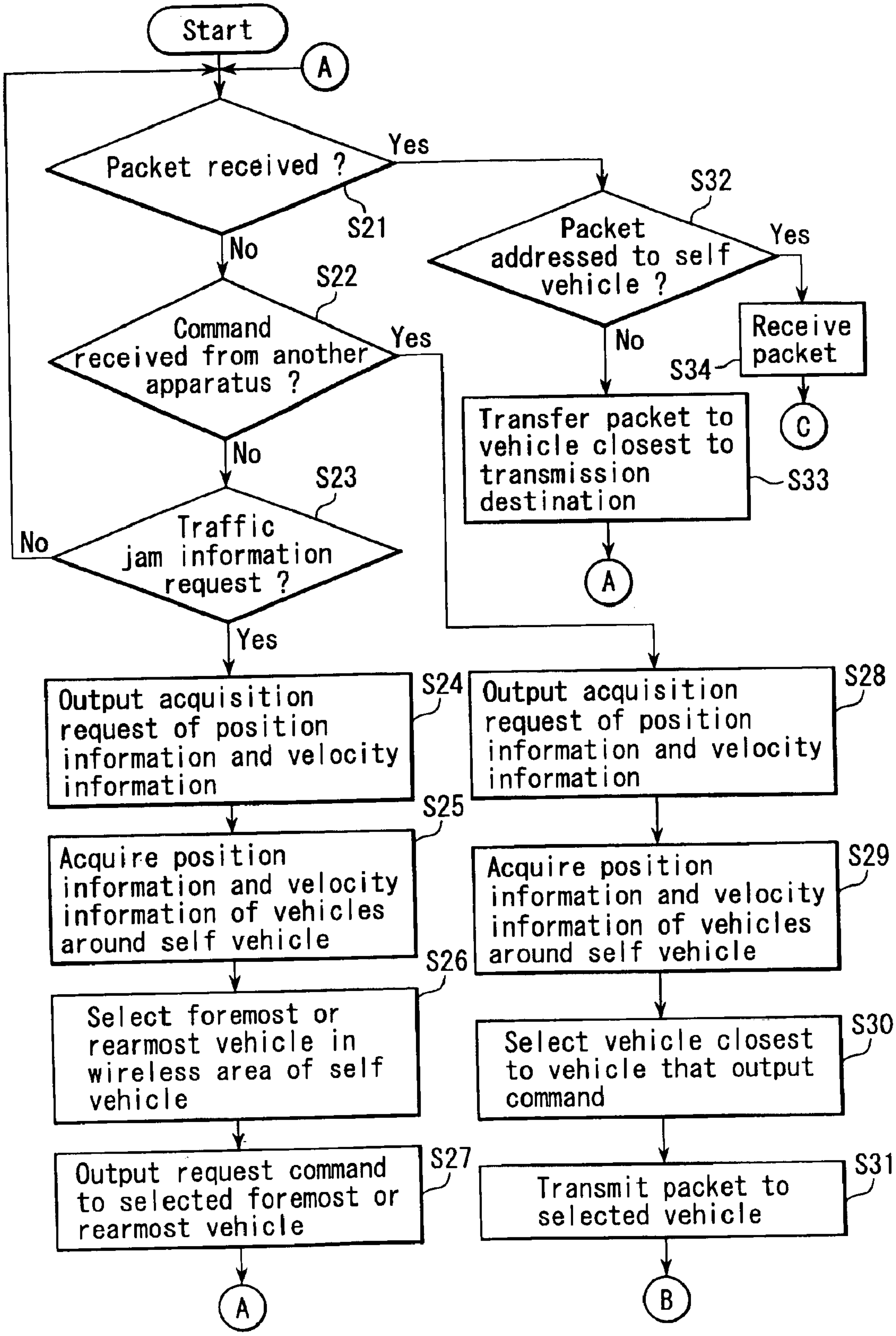
FIG. 8 is a flow chart for explaining the operation of the car navigation apparatus according to the second embodiment of the present invention.
Figure 10:
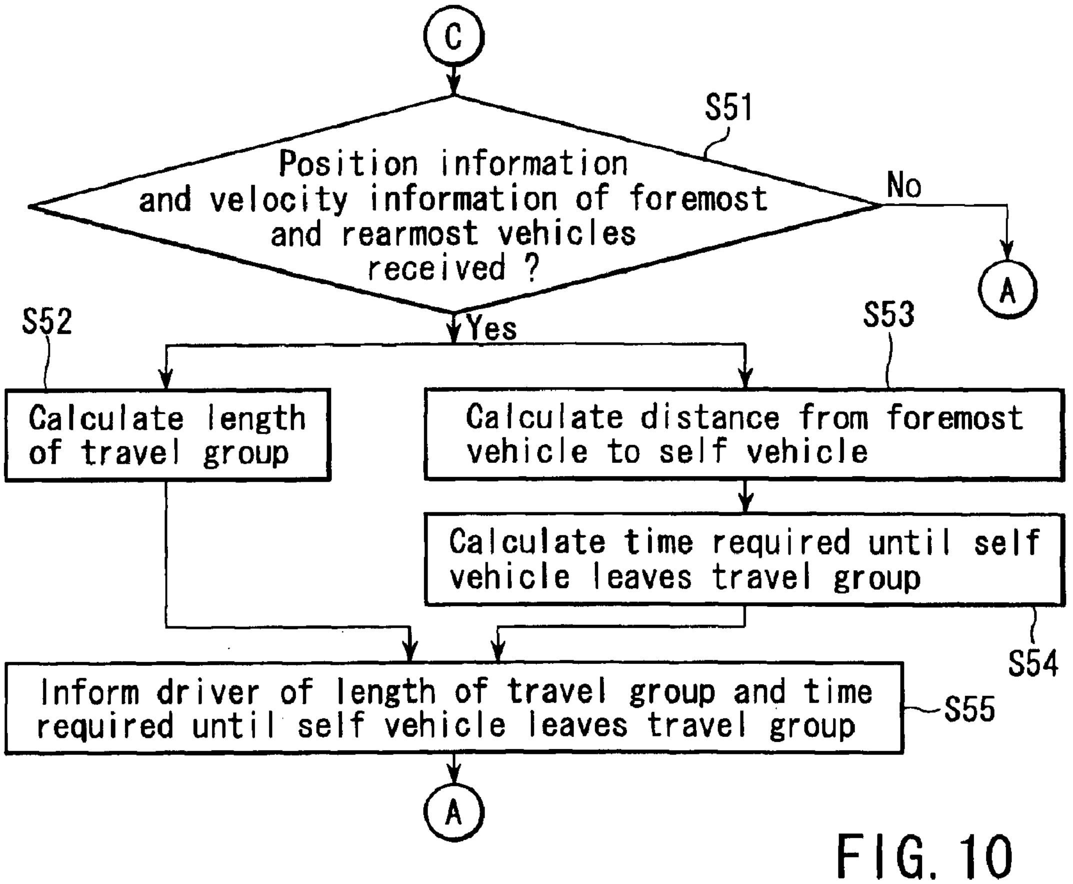
FIG. 10 is flow chart for explaining the operation of the car navigation apparatus according to the second embodiment of the present invention.

The operation of the car navigation apparatus according to the second embodiment of the present invention will be described below with reference to the flow charts of FIGS. 8 to 10.

It is initially checked if a packet that contains position information and velocity information is received from another car navigation apparatus (S21). If it is determined in step S21 that no packet is received, it is then checked if an information request command is received from another car navigation apparatus (S22).

If it is determined in step S22 that no information request command is received from other car navigation apparatuses, it is checked if the driver requests traffic jam information (S23).

If it is determined in step S23 that the driver does not request any traffic jam information, the flow returns to step S21. On the other hand, if it is determined in step S23 that the driver requests traffic jam information, an acquisition request of position information and velocity information is output to vehicles within the wireless LAN area of the self vehicle (S24).

Position information and velocity information which are transmitted from the car navigation apparatuses of surrounding vehicles in response to this acquisition request are acquired (S25). Then, the foremost or rearmost vehicle of the wireless LAN area of the self vehicle is selected based on the acquired information and map information (S26).

A command for acquiring position information and velocity information of the foremost or rearmost vehicle of a travel group including the self vehicle, and at least one vehicle which is included in the travel group and serves as a wireless access point is output to the selected foremost or rearmost vehicle of the wireless LAN area (S27). The flow then returns to step S21.

If it is determined in step S22 that an information request command is received from another car navigation apparatus, an acquisition request of position information and velocity information is output to vehicles within the wireless LAN area of the self vehicle (S28).

Position information and velocity information which are transmitted from the car navigation apparatuses of surrounding vehicles in response to this acquisition request are acquired (S29). Then, a vehicle closest to the vehicle, which issued the command, within the wireless LAN area of the self vehicle is selected based on the acquired information and map information (S30).

A packet that contains the acquired position information and velocity information of the vehicles around the self vehicle is transmitted to the selected vehicle (S31). This packet has the same data structure as that has been explained in the first embodiment using FIG. 5, and contains transmission destination information, transmission source information, a command type, and the like in addition to data to be transmitted.

It is checked if the self vehicle is the foremost or rearmost vehicle of the travel group (S41). If it is determined in step S41 that the self vehicle is the foremost or rearmost vehicle, the flow returns to step S21.

On the other hand, if it is determined in step S41 that the self vehicle is not the foremost or rearmost vehicle, an acquisition request of position information and velocity information is output to vehicles within the wireless LAN area of the self vehicle using the wireless LAN (S42).

Position information and velocity information which are transmitted from the car navigation apparatuses of surrounding vehicles in response to this acquisition request are acquired (S43). Then, the foremost or rearmost vehicle of the wireless LAN area of the self vehicle is selected based on the acquired information and map information (S44).

A command for acquiring position information and velocity information of the foremost or rearmost vehicle of the travel group including the self vehicle, and at least one vehicle which is included in the travel group and serves as a wireless access point is output to the selected foremost or rearmost vehicle of the wireless LAN area (S45). The flow then returns to step S21.

If it is determined in step S21 that a packet is received, it is checked if the received packet is addressed to the self vehicle (S32). If it is determined in step S32 that the received packet is not addressed to the self vehicle, the packet is forwarded to a vehicle closest to a transmission destination indicated by transmission destination data contained in that packet (S33). The flow then returns to step S21.

The packet is forwarded by the following method. That is, a packet is received, and position information and velocity information of the vehicles around the self vehicle are acquired. A vehicle closest to the transmission destination is selected on the basis of the acquired position information and velocity information of vehicles around the self vehicle and the map information. The received packet is then forwarded to the selected vehicle.

If it is determined in step S32 that the packet is addressed to the self vehicle, the packet is received (S34), and it is checked if position information and velocity information of the foremost and rearmost vehicles are received (S51).

If it is determined in step S51 that position information and velocity information of the foremost and rearmost vehicles are not received, the flow returns to step S21. On the other hand, if it is determined in step S51 that position information and velocity information of the foremost and rearmost vehicles are received, the length of the travel group is calculated using the map information on the basis of the acquired position information and velocity information indicating the positions of the foremost and rearmost vehicles (S52). In addition, the distance from the foremost vehicle of the travel group to the self vehicle is calculated using the map information on the basis of the acquired position information of the foremost vehicle and that of the self vehicle (S53).

Furthermore, the time required until the self vehicle leaves the travel group is calculated on the basis of the distance calculated in step S53 and the acquired velocity information of respective vehicles in the travel group (S54). More specifically, this time is calculated by the following method. The average velocity of those indicated by the acquired velocity information of respective vehicles included in the travel group is calculated, and the calculated distance is divided by the average velocity, thus calculating the time.

The driver is informed of the length of the travel group calculated in step S52, and the time required until the self vehicle leaves the travel group, which is calculated in step S54 (S55). The flow then returns to step S21. In this manner, the driver can recognize the state of a traffic jam.

Therefore, with the car navigation apparatus according to the embodiment of the present invention, when the self vehicle is stuck in traffic, the driver can easily recognize the state of a traffic jam using the wireless LAN, and can drive more comfortably.

<Third Embodiment>

A car navigation apparatus according to the third embodiment of the present invention will be described below.

Figure 11:
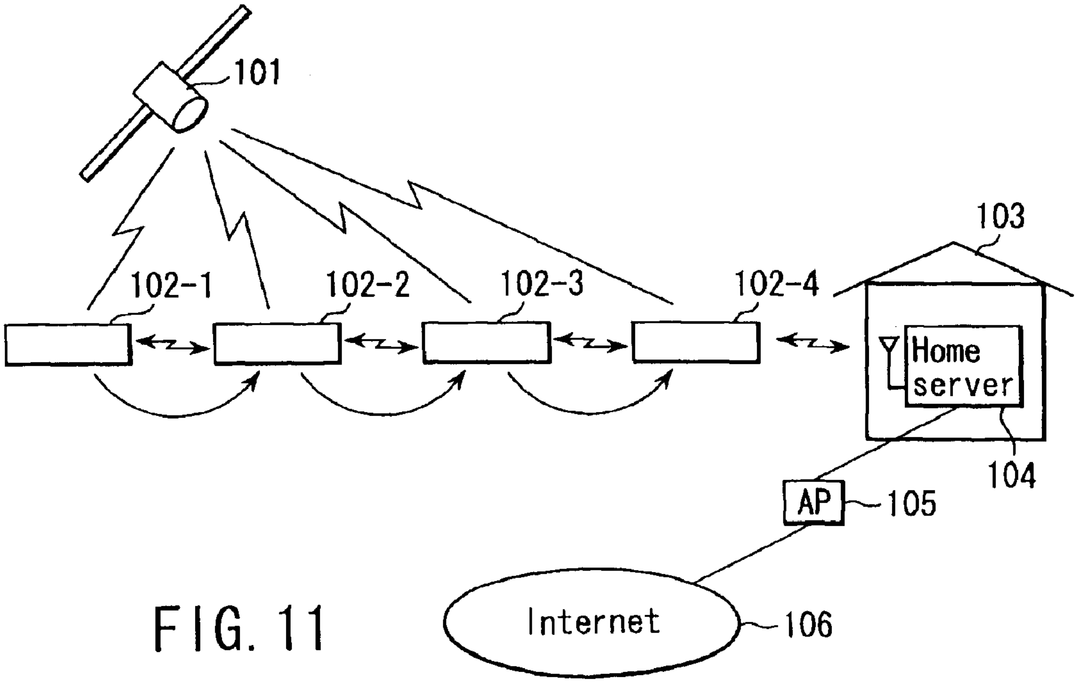
FIG. 11 is a view for explaining the operation of a car navigation apparatus according to the third embodiment of the present invention.

FIG. 11 is a view for explaining the operation of a car navigation apparatus according to the third embodiment of the present invention. A car navigation apparatus according to the embodiment of the present invention sends information to a transmission destination using a wireless LAN.

For example, upon sending information from a vehicle 102-1 to a home server 104 at home 103 as a transmission destination in FIG. 11, the information is transferred to the home server 104 as a transmission destination via vehicles 102-2 to 102-4 serving as transponders (access points) in turn. Such vehicles serving as access points are selected based on position information from a satellite 101, which is acquired using a GPS function, and that selection method is the same as the method of selecting the vehicle closest to the transmission destination in the second embodiment.

The home server 104 as the transmission destination delivers information acquired from the transmission source onto the Internet 106 or the like via an access point 105.

Figure 12:
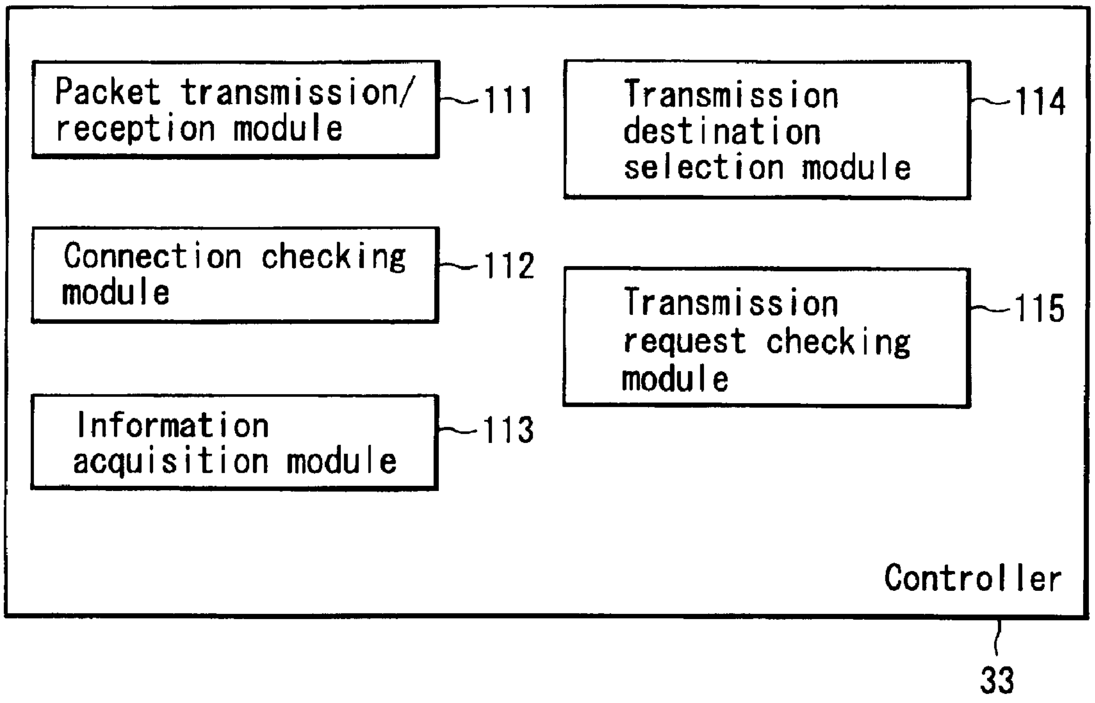
FIG. 12 is a functional block diagram for explaining the functions of a controller 33 according to the embodiment of the present invention.

The car navigation apparatus has basically the same arrangement as that shown in FIG. 3, except for functions of a controller. FIG. 12 is a functional block diagram for explaining the functions of the controller 33 in the car navigation apparatus according to the embodiment of the present invention.

As shown in FIG. 12, the controller 33 comprises a packet transmission/reception module 111, connection checking module 112, information acquisition module 113, transmission destination selection module 114, and transmission request checking module 115.

The packet transmission/reception module 111 transmits/receives a packet that contains information indicating the position of a transmission destination, and information associated with a transmission source to/from another on-vehicle electronic apparatus.

The connection checking module 112 checks if connection can be established to a transmission destination indicated by information contained in a packet using a wireless LAN, when the packet transmission/reception module 111 receives the packet.

The information acquisition module 113 acquires position information and velocity information of the self vehicle using a GPS function, and acquires those of vehicles around (within the wireless LAN area of) the self vehicle using the wireless LAN.

The transmission destination selection module 114 selects a vehicle closest to the transmission destination with reference to map information on the basis of the acquired position information and velocity information of vehicles around the self vehicle, and the information which is contained in the packet and indicates the position of a transmission destination.

The transmission request checking module 115 checks if the driver issues a packet transmission request.

Figure 13:
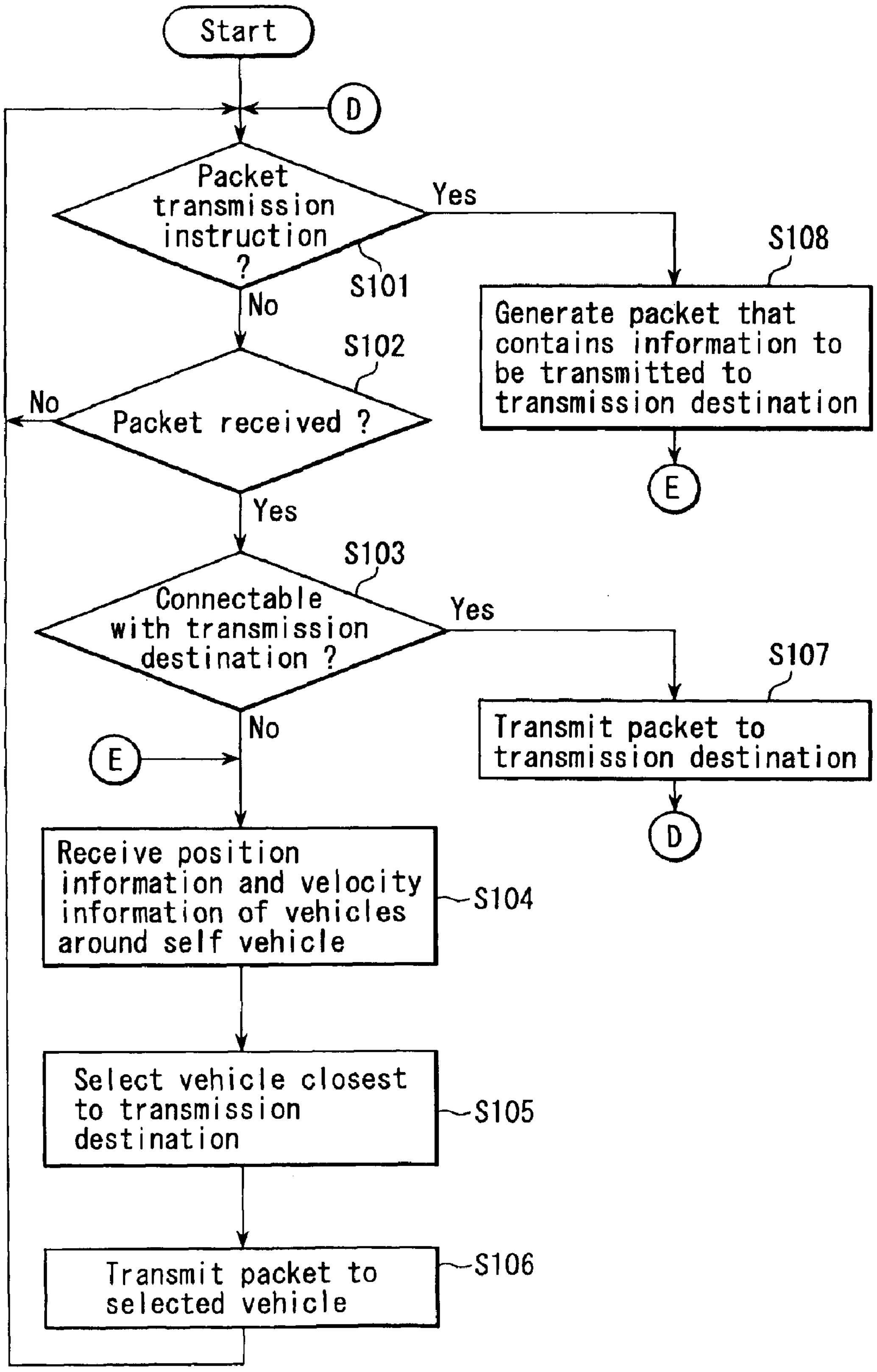
FIG. 13 is a flow chart for explaining the operation of the car navigation apparatus according to the third embodiment of the present invention.

The operation of the car navigation apparatus according to the third embodiment of the present invention will be described below with reference to the flow chart in FIG. 13.

It is initially checked if the driver issues a packet transmission instruction (S101). If it is determined in step S101 that the driver does not issue any transmission instruction, it is checked if a packet is received from another car navigation apparatus (S102).

This packet has the same data structure as that has been explained in the first embodiment using FIG. 5, and contains transmission destination information, transmission source information, a command type, and the like in addition to data to be transmitted. The data to be transmitted contains position information, velocity information, and other information.

If it is determined in step S102 that no packet is received, the flow returns to step S101. On the other hand, if it is determined in step S102 that a packet is received, an attempt is made to establish connection to a transmission destination indicated by the information contained in the packet via the wireless LAN (S103).

If wireless connection with the transmission destination cannot be established in step S103, position information and velocity information of vehicles around (within the wireless LAN area of) the self vehicle are acquired (S104), and a vehicle closest to the transmission destination is selected with reference to map information (S105).

The reason why the velocity information is also used in selection is to execute a process for, e.g., excluding a given vehicle from selection candidates when the difference between the direction of a velocity vector indicated by its velocity information, and that of the velocity vector of the self vehicle is equal to or larger than a predetermined value.

After that, the packet is transmitted to the selected vehicle using the wireless LAN (S106), and the flow then returns to step S101. In this case, information associated with the transmission destination of the packet is recognized by information which indicates the transmission destination and contained in the packet that contains the position information and velocity information acquired in step S104.

On the other hand, if it is determined in step S103 that connection with the transmission destination can be established, the packet is transmitted to the transmission destination using the wireless LAN (S107), and the flow returns to step S101.

If it is determined in step S101 that the driver issues a packet transmission instruction, a packet which contains information to be sent to a transmission destination is generated (S108). The flow then advances to processes in step S104 and subsequent steps. That is, position information and velocity information of vehicles around (within the wireless LAN area of) the self vehicle are acquired (S104), and a vehicle closest to the transmission destination is selected with reference to map information (S105). After that, the packet is transmitted to the selected vehicle using the wireless LAN (S106), and the flow returns to step S101.

Note that the information associated with the transmission destination contained in the packet in step S108 may be an image captured by a camera attached to the vehicle. By transmitting such information, if the transmission destination is a server, the image information can be delivered onto the Internet or broadcast, and can be used as traffic information.

In this case, when an IP address unique to the car navigation apparatus of the vehicle as the transmission source is appended to the packet, the transmission source of the image information can be recognized.

Therefore, with the car navigation apparatus according to the embodiment of the present invention, data can be transmitted using the GPS function and wireless LAN, and utilizing vehicles which are present up to a transmission destination as access points.

<Fourth Embodiment>

A car navigation apparatus according to the fourth embodiment of the present invention will be described below.

A car navigation apparatus according to the embodiment of the present invention, which searches for a route to a destination, and issues an instruction to the driver in correspondence with the current travel position, acquires route information from vehicles around (within the wireless LAN area of) the self vehicle, and searches for another route when a traffic jam in the self route is predicted from the acquired route information.

Figure 14:
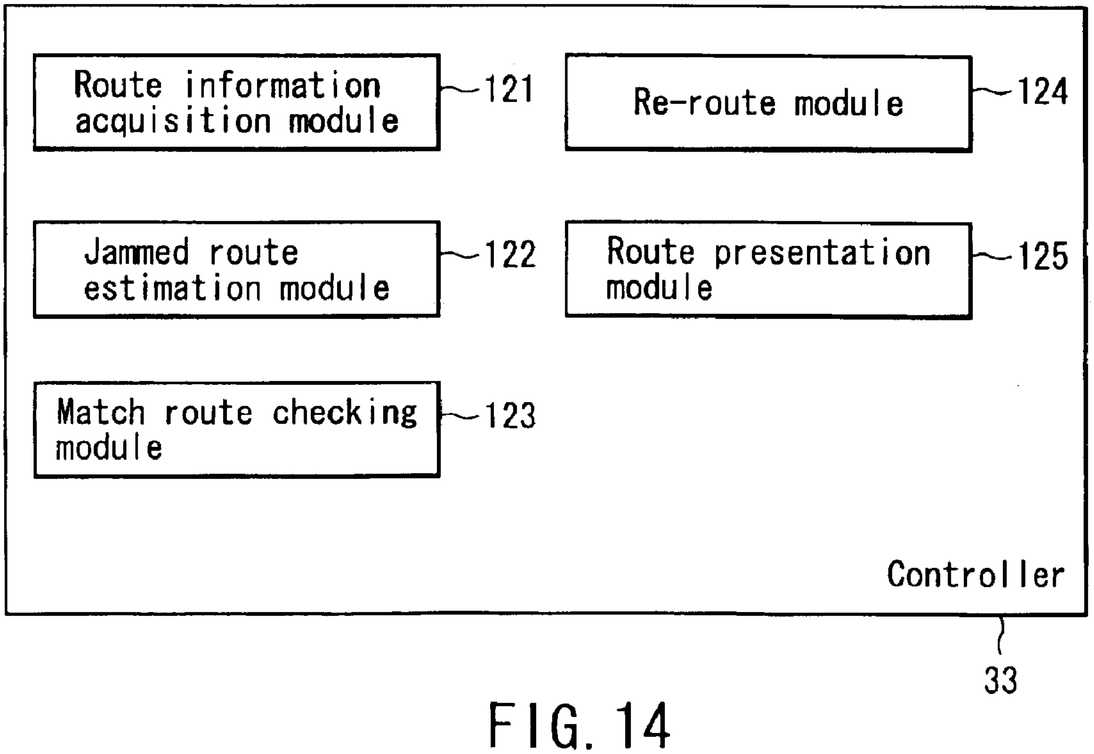
FIG. 14 is a functional block diagram for explaining the functions of a controller 33 in a car navigation apparatus according to the fourth embodiment of the present invention.

The car navigation apparatus has basically the same arrangement as that shown in FIG. 3, except for functions of a controller. FIG. 14 is a functional block diagram for explaining the functions of the controller 33 in the car navigation apparatus according to the fourth embodiment of the present invention.

As shown in FIG. 14, the controller 33 comprises a route information acquisition module 121, congested route estimation module 122, match route checking module 123, re-route module 124, and route presentation module 125.

The route information acquisition module 121 acquires route information from a plurality of vehicles around the self vehicle using a wireless LAN.

The jammed route estimation module 122 estimates a route that may be jammed on the basis of the route information from a plurality of vehicles acquired by the route information acquisition module 121. More specifically, the jammed route is estimated as follows. The acquired routes from a plurality of vehicles are searched for overlapping routes, and when the number of overlapping routes is equal to or larger than a predetermined value, it is determined that the overlapping route is jammed.

The match route checking module 123 checks if the jammed route estimated by the jammed route estimation module 122 matches a part of the self route.

The re-route module 124 searches for another route which does not include the matched route when the match route checking module 123 determines a match.

The route presentation module 125 presents the route found by the re-route module 124 to the driver.

Figure 16:
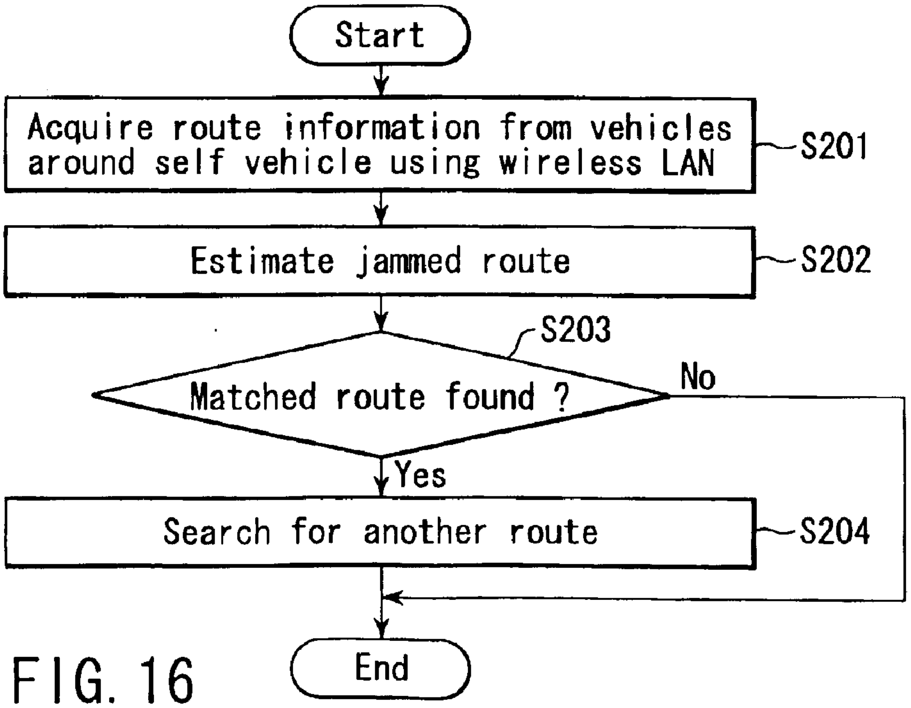
FIG. 16 is a flow chart for explaining the operation of the car navigation apparatus according to the fourth embodiment of the present invention.

The operation of the car navigation apparatus according to the fourth embodiment of the present invention will be described below with reference to the flow chart of FIG. 16.

Initially, route information is acquired from vehicles around the self vehicle using the wireless LAN (S201). The acquisition method of the route information is the same as the method of acquiring position information and velocity information in the first embodiment.

A route that may be jammed is estimated on the basis of the acquired route information from a plurality of vehicles (S202). This route is estimated as described above. That is, the jammed route is estimated as follows. The acquired routes from a plurality of vehicles are searched for overlapping routes, and when the number of overlapping routes is equal to or larger than a predetermined value, it is determined that the overlapping route is jammed.

It is checked if the jammed route estimated by the jammed route estimation module 122 matches a part of the self route (S203). If they do not match, it is determined that the self route does not include the jammed route, thus ending the process.

However, if it is determined that the two routes match, another route which does not include the matched route is searched for (S204), and the found route is presented to the driver, thus ending the process.

Figure 15:
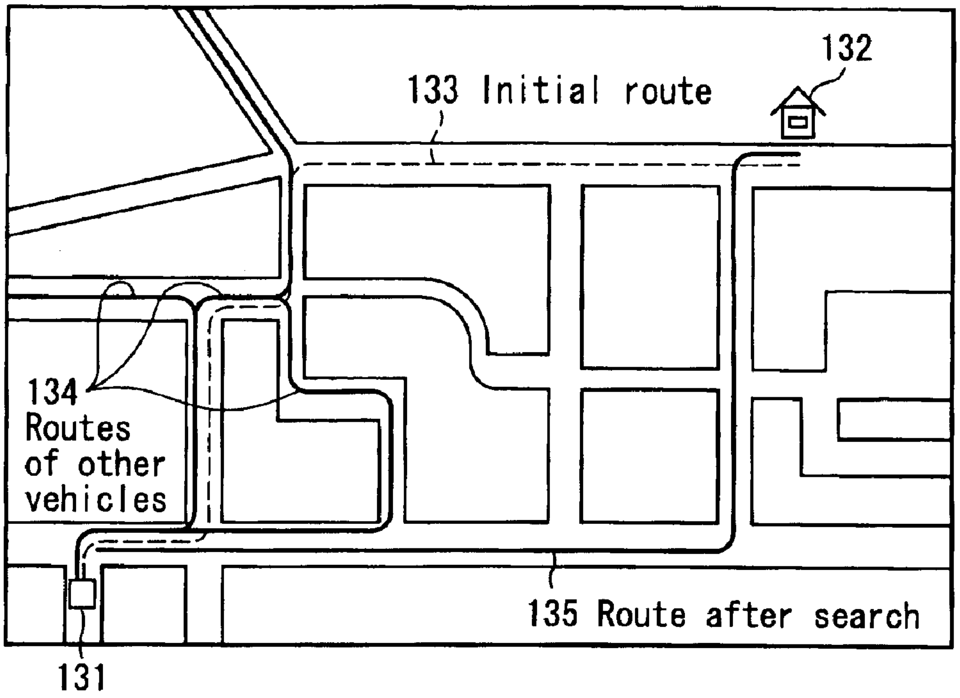
FIG. 15 shows a display example of a route search result on a screen.

FIG. 15 shows a display example of the route search result on a screen. In FIG. 15, an initial route 133 from a self vehicle 131 to home 132 as a destination is indicated by the broken line. Also, routes 134 of other vehicles are indicated by the solid lines.

Assuming that the initial route 133 of the self vehicle matches a part of the acquired routes 134 of other vehicles, and the number of matches is large enough to predict a traffic jam, rerouting is done. A route 135 is that after rerouting.

Therefore, according to the embodiment of the present invention, in a car navigation apparatus which searches for a route to a destination, and issues an instruction to the driver in correspondence with the current travel position, a route that does not contain a jammed route can be searched for. Hence, the driver can drive comfortably while beating traffic jams.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An on-vehicle electronic apparatus comprising:

a wireless communication unit that makes a wireless communication via a wireless LAN;

means for acquiring travel information from vehicles around a self vehicle using the wireless communication unit, and means for taking a collision avoidance measure on the basis of the acquired travel information, wherein the means for acquiring travel information comprises:

means for acquiring position information and velocity information indicating positions and velocities of vehicles before and after the self vehicle using the wireless communication unit; and means for calculating inter-vehicle distances between the self vehicle and the vehicles before and after the self vehicle with reference to map information on the basis of the acquired position information and velocity information, and wherein the means for taking the collision avoidance measure takes the collision avoidance measure when the calculated inter-vehicle distances are not more than a predetermined distance, and the velocities of the self vehicle and the vehicles before and after the self vehicle are not less than a predetermined velocity.

2. An apparatus according to claim 1, wherein the means for acquiring the position information and velocity information comprises:

means for acquiring position information and velocity information of vehicles around the self vehicle using the wireless communication unit; and means for selecting position information and velocity information of the vehicles before and after the self vehicle from the acquired position information and velocity information of the vehicles around the self vehicle on the basis of the map information.

3. An apparatus according to claim 1, wherein the means for calculating the inter-vehicle distances comprises:

means for determining positions on a map on the basis of the acquired position information and position information of the self vehicle; and means for calculating the inter-vehicle distances on the basis of the determined positions on the map with reference to the map information.

4. An on-vehicle electronic apparatus comprising:

means for acquiring travel information of a travel group including a self vehicle; and means for informing a driver of information of the travel group on the basis of the acquired travel information, wherein the means for acquiring the travel information comprises:

means for acquiring position information and velocity information indicating positions and velocities of foremost and rearmost vehicles of the travel group including the self vehicle, and of at least one vehicle that is included in the travel group and serves as a wireless transponder using a wireless LAN of vehicles included in the travel group;

means for calculating a length of the travel group using map information on the basis of the acquired position information indicating the positions of the foremost and rearmost vehicles;

means for calculating a distance from the foremost vehicle of the travel group to the self vehicle using the map information on the basis of the acquired position information of the foremost vehicle and the acquired position information of the self vehicle; and means for calculating a time required until the self vehicle leaves the travel group, on the basis of the acquired velocity information of the respective vehicles and the calculated distance, and wherein the means for informing the information of the travel group informs the driver of the self vehicle of the calculated length of the travel group and the calculated time.

5. An apparatus according to claim 4, wherein the means for acquiring the position information and velocity information comprises:

means for acquiring position information and velocity information of vehicles around the self vehicle;

means for selecting foremost and rearmost vehicles of a wireless area of the self vehicle with reference to the map information on the basis of the acquired position information and velocity information of the vehicles around the self vehicle;

means for outputting, to the selected vehicle, a command for acquiring position information and velocity information of the foremost and rearmost vehicles of the travel group including the self vehicle, and of the at least one vehicle that is included in the travel group and serves as the wireless transponder; and means for receiving the position information and velocity information of the foremost and rearmost vehicles of the travel group, and the at least one vehicle that is included in the travel group and serves as the wireless transponder in response to the command.

6. An apparatus according to claim 4, wherein the means for calculating the time, comprises:

means for calculating an average velocity of the velocities indicated by the acquired velocity information of the respective vehicles included in the travel group; and means for calculating the time by dividing the calculated distance by the average velocity.

7. An apparatus according to claim 5, further comprising:

means for acquiring position information and velocity information of vehicles around the self vehicle in response to the command from another on-vehicle electronic apparatus;

means for selecting a vehicle closest to a vehicle, which issued the command, with reference to the map information on the basis of the acquired position information and velocity information of the vehicles around the self vehicle; and means for transmitting, to the selected vehicle, a packet containing the acquired position information and velocity information of the vehicles around the self vehicle.

8. An apparatus according to claim 7, further comprising:

means for checking if the self vehicle is a foremost or rearmost vehicle of the travel group, after the packet is transmitted;

means for, when it is determined that the self vehicle is not the foremost or rearmost vehicle, acquiring the position information and velocity information of the vehicles around the self vehicle using the wireless LAN;

means for selecting a foremost or rearmost vehicle of the wireless area of the self vehicle with reference to the map information on the basis of the position information and velocity information of the vehicles around the self vehicle; and means for outputting, to the selected vehicle, a command for acquiring the position information and velocity information of the foremost and rearmost vehicles of the travel group including the self vehicle, and of the at least one vehicle that is included in the travel group and serves as the wireless transponder.

9. An apparatus according to claim 7, further comprising:

means for receiving a packet containing position information and velocity information of a transmission source from another on-vehicle electronic apparatus;

means for, when a transmission destination of the received packet is not the self vehicle, acquiring position information and velocity information of vehicles around the self vehicle;

means for selecting a vehicle closest to the transmission destination with reference to the map information on the basis of the acquired position information and velocity information of the vehicles around the self vehicle; and means for transferring the received packet to the selected vehicle.

10. An on-vehicle electronic apparatus comprising:

means for receiving a packet containing information indicating a position of a transmission destination and information to be transmitted to the transmission destination, from another on-vehicle electronic apparatus;

means for, when the packet is received, checking if connection with the transmission destination indicated by the information contained in the packet can be established using a wireless LAN;

means for, when the connection can be established, transmitting the information to be transmitted to the transmission destination, which is contained in the packet, to the transmission destination using the wireless LAN;

means for, when the connection cannot be established, acquiring position information and velocity information of vehicles around a self vehicle using the wireless LAN;

means for selecting a vehicle closest to the transmission destination with reference to map information on the basis of the acquired position information and velocity information of the vehicles around the self vehicle, and the information that is contained in the packet and indicates the position of the transmission destination; and means for transmitting the packet to the selected vehicle using the wireless LAN.

11. An apparatus according to claim 10, further comprising means for transmitting a packet containing information indicating a position of a transmission destination and information to be transmitted to the transmission destination.

12. A collision avoidance method for an on-vehicle electronic apparatus, comprising:

acquiring position information and velocity information indicating positions and velocities of vehicles before and after a self vehicle using a wireless communication unit that makes a wireless communication via a wireless LAN;

calculating inter-vehicle distances between the self vehicle and the vehicles before and after the self vehicle with reference to map information on the basis of the acquired position information and velocity information; and taking a collision avoidance measure when the calculated inter-vehicle distances are not more than a predetermined distance, and the velocities of the self vehicle and the vehicles before and after the self vehicle are not less than a predetermined velocity.

13. A traffic jam information notification method for an on-vehicle electronic apparatus, comprising:

acquiring position information and velocity information each indicating positions and velocities of foremost and rearmost vehicles of a travel group including a self vehicle, and of at least one vehicle that is included in the travel group and serves as a wireless transponder using a wireless LAN of vehicles included in the travel group;

calculating a length of the travel group using map information on the basis of the acquired position information indicating the positions of the foremost and rearmost vehicles;

calculating a distance from the foremost vehicle of the travel group to the self vehicle using the map information on the basis of the acquired position information of the foremost vehicle and position information of the self vehicle;

calculating a time required until the self vehicle leaves the travel group, on the basis of the acquired velocity information of the respective vehicles and the calculated distance; and notifying a driver of the self vehicle of the calculated length of the travel group and the calculated time.

14. An information transmission method for an on-vehicle electronic apparatus, comprising:

checking if a packet which contains information indicating a position of a transmission destination and information to be transmitted to the transmission destination is received from another on-vehicle electronic apparatus;

checking, when the packet is received, if connection with the transmission destination indicated by the information contained in the packet can be established using a wireless LAN;

transmitting, when the connection can be established, the information to be transmitted to the transmission destination, which is contained in the packet, to the transmission destination using the wireless LAN;

acquiring, when the connection cannot be established, position information and velocity information of vehicles around a self vehicle using the wireless LAN;

selecting a vehicle closest to the transmission destination with reference to map information on the basis of the acquired position information and velocity information of the vehicles around the self vehicle, and the information that is contained in the packet and indicates the position of the transmission destination; and transmitting the packet to the selected vehicle using the wireless LAN.

15. An on-vehicle electronic apparatus comprising:

means for receiving a packet containing information indicating a position of a transmission destination and information to be transmitted to the transmission destination from a first on-vehicle electronic apparatus using a wireless LAN; and means for transmitting the received packet to a second on-vehicle electronic apparatus using the wireless LAN, wherein the transmitting means comprises:

means for checking if connection with the transmission destination indicated by the received packet can be established using the wireless LAN;

means for, when the connection can be established, transmitting the packet to the transmission destination;

means for, when the connection cannot be established, acquiring position information and velocity information of vehicles around the self vehicle using the wireless LAN; and means for obtaining the second on-vehicle electronic apparatus closest to the transmission destination based on the acquired position information and velocity information of vehicles around a self vehicle using the wireless LAN.

16. An apparatus according to claim 15, wherein the second on-vehicle electronic apparatus is closest to the transmission destination of on-vehicle electronic apparatuses around the self vehicle.

17. An apparatus according to claim 15, wherein the second on-vehicle electronic apparatus is obtained with reference to map information based on the acquired position information and velocity information of vehicles around the self vehicle.

18. An information transmission method for on-vehicle electronic apparatus, comprising:

receiving a packet containing information indicating a position of a transmission destination and information to be transmitted to the transmission destination, from a first on-vehicle electronic apparatus using a wireless LAN; and transmitting the received packet to a second on-vehicle electronic apparatus using the wireless LAN, wherein the transmitting comprises:

checking if connection with the transmission destination indicated by the received packet can be established using the wireless LAN;

transmitting the packet to the transmission destination when the connection can be established;

acquiring position information and velocity information of vehicles around a self vehicle using the wireless LAN when the connection cannot be established; and obtaining the second on-vehicle electronic apparatus closest to the transmission destination based on the acquired position information and velocity information of vehicles around the self vehicle using the wireless LAN.

19. A method according to claim 18, wherein the second on-vehicle electronic apparatus is obtained with reference to map information based on the acquired position information and velocity information of vehicles around a self vehicle.

* * * * *